Nov. 4, 1958     H. BRAUS ET AL     2,859,117
TREATMENT OF ALCOHOLIC LIQUORS

Filed Oct. 26, 1956     2 Sheets-Sheet 1

HARRY BRAUS
STUART SCHOTT
*INVENTORS*

BY Lawrence Rosen
ATTORNEY

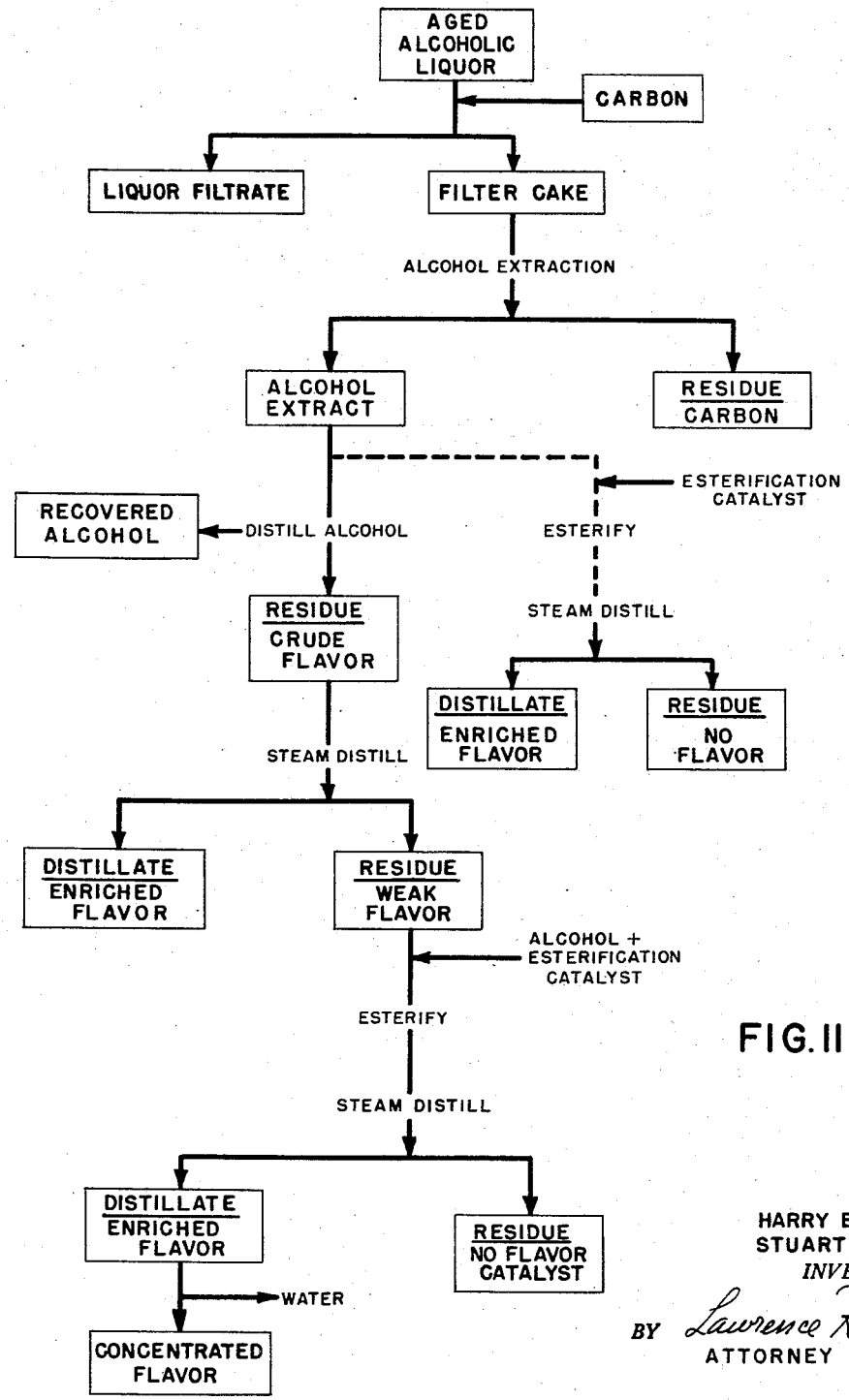
FIG. II

2,859,117

TREATMENT OF ALCOHOLIC LIQUORS

Harry Braus, Springdale, and Stuart Schott, Cincinnati, Ohio, assignors to National Distillers and Chemical Corporation, a corporation of Virginia Application October 26, 1956, Serial No. 618,627

10 Claims. (Cl. 99—78)

This invention relates to a new and improved method for obtaining flavor-producing substances or concentrates thereof. More particularly, the invention pertains to the recovery of flavor-producing or congeneric constituents and flavor-producing precursors from various whiskies and other distilled alcoholic liquors, which have been aged in wooden containers or barrels.

The treatment of whiskey with carbon or by chilling to obtain the adsorption or floc precipitation of haze-producing constituents and other substances is well known. In general, these processes merely involve contacting the whiskey with the carbon or cooling the whiskey to a temperature sufficiently low enough to obtain a gelantinous floc. Conventional filter aids are usually employed in these proceses to assist in the subsequent separation of the filtrate of supernatant liquid from the filter cake. The exact nature of the materials adsorbed by the carbon or floc precipitated has not been determined.

In accordance with the present invention, it has now been found that congeneric substances as well as weakly flavored and flavor-producing precursor constituents found in high alcoholic liquors may be effectively recovered and separated. The advantages of recovering the hitherto unavailable flavor-producing materials are obvious. Whiskey flavorants can, for example, be successfully used to impart true whiskey flavor to cakes, candies, toothpastes, foods, etc. Another aspect of the invention comprises converting the weakly flavored materials and flavor-producing precursors to strongly flavored substances.

In general, the present invention comprises carbon-treating or chill-treating the whiskies or distilled alcoholic liquors; separating the carbon having the materials adsorbed thereon or the precipitated gelatinous floc from the supernatant liquid by filtration or centrifugation; extracting the recovered filter cake with a solvent for the congeneric and flavor-producing precursor constituents; separating the extract from the carbon and insoluble material; and then removing the solvent from the extract and recovering a residue containing the congeneric and flavor-producing precursors. The residue may be subsequently distilled to separate the highly flavored from the weakly flavored material and flavor-producing precursors. The highly flavorable substances so recovered may be used directly as flavorants.

As noted above, another feature of the present invention involves converting the weakly flavored substances and flavor-producing precursors to highly flavored materials. In general, this conversion comprises subjecting these substances to esterification. The resulting enriched flavors are then recovered and concentrated, if desired.

In order to better illustrate the practice of the present invention, reference is had to the accompanying drawings in which:

Figure 2 is another flow sheet illustrating an alternate method of practicing the invention.

Figure 1:
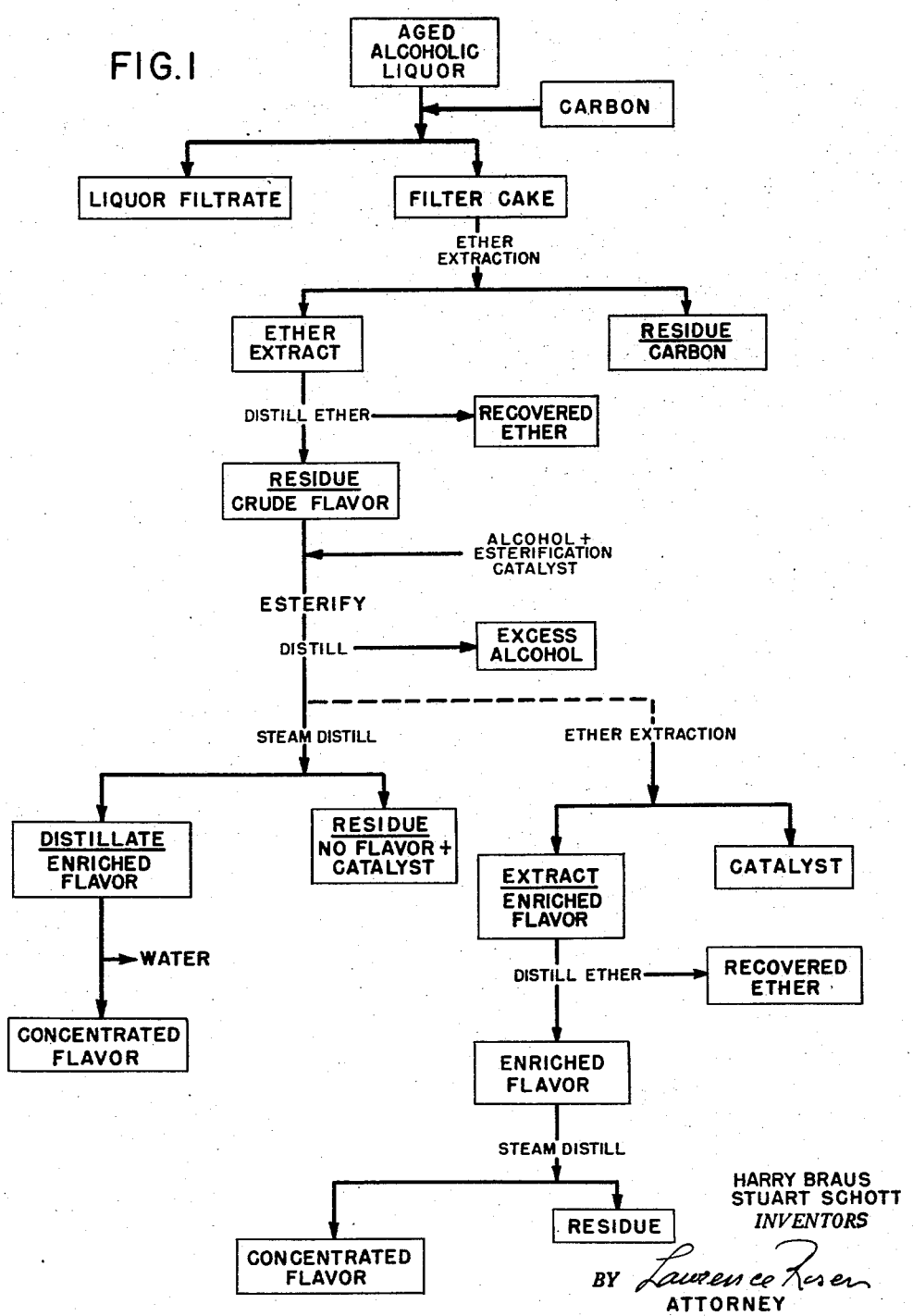
Figure 1 is a flow sheet illustrating the practice of the invention.

The flow sheets illustrated in Figures 1 and 2 are believed to be self-explanatory and, therefore, do not require detailed description. As illustrated in Figure 1, the distilled alcoholic liquid treatment comprises intimately contacting with stirring the aged but raw liquor with carbon, recovering a carbon filter cake containing adsorbed congeneric and flavor-producing precursor constituents, extracting the adsorbed materials from the carbon, distilling the extract to remove the extractant, and recovering as the crude residue the flavored materials and flavor-producing precursors. In accordance with one aspect of the invention, the crude flavor residue is further treated by subjecting it to esterification in the presence of an excess of ethanol and a conventional esterification catalyst. The excess alcohol is subsequently removed by distillation. The esterified crude flavor residue may then be steam distilled to recover an enriched flavor distillate, which is subsequently treated to separate water. Concentrated liquor or whiskey flavorants are then recovered. As further shown in Figure 1, all or part of the esterified crude flavor residue may be treated by subjecting it to an ether extraction to recover an enriched flavor extract. The ether extract is distilled to remove the ether. The enriched flavor concentrate recovered by distillation may be then further concentrated by steam distillation.

Referring to Figure 2, an alternate method of practicing the invention is set forth wherein an alcohol rather than an ether is employed to extract the congeneric and flavor-producing precursor material. As illustrated, the alcohol extract may be subjected to distillation to recover the alcohol, and the resulting crude flavor residue steam distilled to recover an enriched flavor distillate and a weakly flavored residue. The residue may be further treated by subjecting it to esterification, as described in Figure 1, to obtain concentrated flavors. In accordance with a further alternate method shown in Figure 2, all or part of the alcohol extract may be directly subjected to esterification in the presence of an esterification catalyst, and then steam distilled to recover an enriched distillate.

Though the use of carbon has been described in the flow sheets of Figures 1 and 2, it is also contemplated that the congeneric materials and flavor-producing precursors may be recovered by cooling the raw aged alcoholic liquor, preferably in the presence of a filter aid, to a temperature sufficiently low enough to obtain floc precipitation. The aged liquor may be chilled, for example, to a temperature within the range of about —17° to +10° C., though cooling may be carried out at any temperature at which floc precipitation will occur. Conventional filter aids which may be employed in this process include magnesium silicate, cellulose, diatomaceous earth, etc.

The aged alcoholic liquor which may be employed in the process of the invention includes all of the distilled high alcohol content liquors of the whiskey and other types such as bourbon, rye, wheat, rum, brandy, Scotch, etc. which have been aged in barrels or other containers as is commonly practiced in the distilling industry.

The carbon employed in the process may be activated carbon, charcoal or any substance containing a substantial amount of carbon and which will effectively adsorb the congeneric and flavor-producing precursor material. The amount of carbon employed is not an essential feature of the invention. In general, a filter aid material, such as those described above, will be employed when ease of separation and a clear filtrate are desired.

The ether and alcohol extractants useful in carrying out the invention may be any of those well known to the art. Examples of such extractants are, methyl ether, diethyl ether, ethyl methyl ether, methyl alcohol, ethyl alcohol, propyl alcohol, or butyl alcohol. In general, aliphatic ethers having from about 2 to 5 carbon atoms per molecule, preferably diethyl ether, and aliphatic alcohols having from about 1 to 4 carbon atoms per molecule, preferably ethyl alcohol, may be utilized. The alcohol employed in the esterification treatments will ordinarily be ethyl alcohol. Any of the known esterification catalysts may be employed. Such catalysts include, for example, sulfuric acid, hydrochloric acid, ion exchange resins such as a phenol sulfonic acid cation exchange resin.

The conditions under which the congeneric and flavor-producing precursor materials are removed from the raw liquor by carbon adsorption or floc precipitation can readily be determined and are not essential features of the invention. The time period during which the liquor is contacted with the carbon adsorbent can range from about fifteen minutes to several hours depending on the efficiency of the agitation. When the floc precipitation method is employed, the raw liquor is held at the floc precipitating temperature for a period of about 10 minutes to twelve hours depending on the temperature and degree of agitation. The various ether and alcohol extractions employed are carried out under conventional extraction conditions and in conventional extraction apparatus well known to the art. Similarly, the distillation conditions used in recovering extractants, removing water and separating enriched flavor material from residues containing non-flavor or only weak flavor constituents are readily determined and do not constitute essential features of this invention.

The esterification of the crude flavor or weak flavor residue in the presence of a low molecular weight aliphatic alcohol and an esterification catalyst is one of the important features of the present invention. By this step, weak congeneric materials and flavor-producing precursors are converted to strongly flavored compounds. The esterification is carried out at temperature of about 50° to 100° C., preferably about 70° to 80° C., for about 2 to 3 hours, or until esterification is completed. The alcohol and catalysts employed in this step have been described above. In accordance with another aspect of the invention, an ethanol extract obtained from the extraction of the filter cake can be directly subjected to esterification without the further addition of alcohol provided sufficient alcohol is employed in the extraction step.

The invention will be further understood by reference to the following examples.

Example I

Straight whiskey, 2580 gallons, at 86 proof was mixed with 5.75 lbs. of carbon and 5.75 lbs. of magnesium silicate with stirring. After a contact time of one-half hour, the supernatant whiskey was filtered from the filter cake which comprises the filter aid, the carbon, and adsorbed flavor material. The filter cake was then extracted with diethyl ether in a continuous liquid-solid extractor. The ether was then distilled from the ether extract leaving an oily semi-solid material having the characteristic odor of whiskey. The amount of semi-solid material recovered was 290 grams or 11%, based on the weight of carbon employed.

Example II

The filter cake obtained by the method described in Example I was extracted with 95% ethyl alcohol. After removing the ethyl alcohol from the extract, an oily semi-solid weighing 654 grams having the characteristic whiskey flavor was recovered. Based on the weight of carbon employed, the amount of material recovered was 25%.

Example III

A batch of 2580 gallons of 86 proof whiskey was chilled to a temperature of about minus 8° C. and held at this temperature for 48 hours. About 5.75 lbs. of magnesium silicate was added to the chilled whiskey. The whiskey was then filtered, and a residue obtained on the filter was recovered. The recovered residue was then extracted with diethyl ether. The ether was then evaporated from the extract, and 200 grams of an oily semi-solid material having a characteristic whiskey odor was recovered.

Example IV

The alcoholic solution from Example II may be directly esterified in the presence of an esterification catalyst. Or the ether extract after removal of the ether and solution in ethyl alcohol may be used.

To 500 ml. of the alcoholic solution is added an excess of a strong acid ion exchange resin catalyst. The mixture is then refluxed with stirring until equilibrium is reached—approximately 3 hours. The insoluble resin catalyst is removed by filtration. The excess alcohol is removed by distillation under reduced pressure. The residue remaining is of a strong whiskey odor and is useful as such.

An alternative method for treating the residue after esterification consists of steam distillation to intensify the odorous components. Fifty grams of alcohol free-resin free extract is steam distilled until the condensate is virtually free of organic material. The organic materials in the distillate are freed from water by extraction with ether and evaporation of the latter in the conventional manner.

It will be understood that the oily semi-solid materials disclosed above can be used directly to impart a whiskey flavor to cakes, candies, etc. It is also contemplated, as shown in the drawings and general description of the invention, to further refine the crude congeneric material to obtain concentrated flavors, which are particularly useful for the purposes described above. Furthermore, the additional flavorants obtained in this process by esterifying weakly flavored and flavor-producing precursor constituents of the raw aged liquor may be similarly employed.

By the term "congeneric" as used in the specification and claims is meant those highly aromatic and flavored constituents, which produce the characteristic bouquet of whiskey and other high alcoholic distilled liquors.

As previously discussed, the exact nature of the congeneric and flavor-producing precursor materials is not known. The presence of esters in the strongly flavored materials has been detected. Non-flavorable or weak flavor materials are believed to contain a large percentage of palmitic acid, stearic acids and the ethyl esters thereof. The flavor-producing precursors have not been exactly identified. They are, however, considered to be acid-type materials having little or no flavor by themselves, but which yield strongly flavored material on esterification.

It is to be understood, that this invention is not necessarily limited to the preferred embodiments or to the specific details set forth above. Variations in the materials treated or in the operating conditions may be made without departing from the scope of the invention.

What is claimed is:

1. A process for treating aged distilled alcoholic liquor which comprises contacting said liquor with carbon whereby congeneric and flavor-producing precursor material are adsorbed on said carbon, separating the resulting filter cake from supernatant liquor, extracting the adsorbed material from the filter with a solvent selected from the group consisting of alcohol and ethers, distilling the solvent from said extract, recovering a crude flavor residue, esterifying said crude flavor residue in the presence of an alcohol and an esterification catalyst, and then distilling said esterified residue to obtain a distillate comprising enriched flavors.

2. The process of claim 1 wherein said liquor is straight whiskey.

3. The process of claim 1 wherein said solvent alcohols are aliphatic alcohols having from about 1 to 4 carbon atoms per molecule.

4. The process of claim 1 wherein said solvent ethers are aliphatic ethers having from about 2 to 5 carbon atoms per molecule.

5. The process of claim 1 wherein said enriched flavor residue is concentrated by heating to remove water contained therein.

6. The process of claim 1 wherein said esterification alcohol is ethanol.

7. The process of claim 1 wherein said esterification catalyst is an ion exchange resin catalyst.

8. The process of claim 1 wherein at least a portion of said esterified crude flavor residue is extracted with ether to recover an extract containing enriched flavors, removing the ether from the resulting extract and recovering enriched flavors.

9. A process for treating aged alcoholic liquors which comprises contacting said liquor with carbon whereby congeneric and flavor-producing material is adsorbed on said carbon, separating the carbon containing absorbed material from supernatant liquor, extracting the resulting filter cake with an aliphatic alcohol, recovering said alcohol extract, subjecting said extract to esterification in the presence of an esterification catalyst, distilling said esterified extract to obtain a distillate comprising enriched flavors.

10. The process of claim 9 wherein said alcohol is ethanol.

References Cited in the file of this patent

UNITED STATES PATENTS

| | | |
|---|---|---|
| 969,332 | Brangier | Sept. 6, 1910 |
| 2,571,948 | Sair et al. | Oct. 16, 1951 |